United States Patent [19]
Tischlinger

[11] 3,921,633
[45] Nov. 25, 1975

[54] FINGER GRIP DEVICE
[75] Inventor: Edward A. Tischlinger, Niantic, Conn.
[73] Assignee: Survival Technology, Inc., Bethesda, Md.
[22] Filed: May 6, 1974
[21] Appl. No.: 467,157

[52] U.S. Cl.............. 128/218 R; 128/215; 128/216
[51] Int. Cl.².......................................... A61M 5/18
[58] Field of Search ............ 128/215, 218 P, 218 C, 128/218 D, 218 DA, 218 PA, 218 F, 218 R, 218 N, 218 NV, 220, 234–238, 261; 403/368, 369, 371; 285/249, 255, 322, 323

[56] References Cited
UNITED STATES PATENTS

| | | | |
|---|---|---|---|
| 1,113,770 | 10/1914 | Gabrohn | 285/249 |
| 1,175,532 | 3/1916 | Lambkin | 285/249 |
| 1,670,259 | 5/1928 | Herlbauer | 285/322 |
| 2,678,647 | 5/1954 | Bruger | 128/218 R |
| 2,854,975 | 10/1958 | Cohen | 128/218 N |
| 3,534,989 | 10/1970 | Yonkers | 285/323 X |
| 3,606,396 | 9/1971 | Prosdocimo et al. | 285/249 |

FOREIGN PATENTS OR APPLICATIONS

| | | | |
|---|---|---|---|
| 426,587 | 3/1926 | Germany | 128/234 |
| 1,168,607 | 4/1964 | Germany | 128/235 |
| 1,284,148 | 11/1968 | Germany | 128/235 |

*Primary Examiner*—Aldrich F. Medbery
*Attorney, Agent, or Firm*—Witherspoon and Lane

[57] ABSTRACT

A finger grip device is affixed to a cartridge tube of a syringe for holding the syringe, said device comprising a collet having a smooth even diametrical inner surface fitting over the cartridge tube and having a tapered outer surface, the collet is also provided with longitudinal slots, the collet's tapered outer surface fits into a similarly tapered surface of a collet sleeve whereby relative movement between the collet and collet sleeve will force the collet into snug engagement with the cartridge tube. The collet sleeve is provided with outstanding wing portions to act as finger grips.

3 Claims, 5 Drawing Figures

FINGER GRIP DEVICE

SUMMARY OF THE INVENTION

This invention relates to a finger grip device and, more particularly, to a finger grip device adapted to grip the open end of a cartridge tube to provide the finger gripping means whereby the cartridge when equipped with a cannula and a plunger rod will comprise an operational syringe assembly.

In the field of syringes, there is a never ending need for improvements which will simplify production and associated costs as well as the need for improvements relating to the use and operation of the syringe itself. Throw-away units are quite popular today, thus it is necessary to produce such units at very small costs and further provide means for not discarding parts which could be used over again. It is this area to which this invention is directed, namely the provision of syringe parts which may be used with throw-away units and retained for further use.

In view of the above, it is an object of this invention to provide a finger grip device for a tubular cartridge of the one-use type which finger grip device may be used many times.

It is a further object of this invention to provide a finger grip device comprising a collet and a collet sleeve, which sleeve is used to compress the collet against and grip a tubular member positioned therewithin.

It is yet another object of this invention to provide a finger grip device adapted to be affixed to a tubular cartridge which is inexpensive to manufacture and simple to use.

The above and other objects and advantages will become more apparent when taken in conjunction with the following detailed description and drawings covering a preferred embodiment of this invention.

IN THE DRAWINGS

FIG. 1 is a perspective view of a syringe assembly including the finger grip device, FIG. 2 is an exploded perspective illustrating the collet and collet sleeve which comprise this invention, FIG. 3 is a cross-sectional view showing the finger grip device in assembled condition, FIG. 4 is a view partly in section illustrating the positioning of a cylindrical member, which in this instance is a cartridge tube, within the finger grip device in loose engagement with the collet, and FIG. 5 is a view partly in section showing the manner in which the collet grips the cylindrical member upon compression of the collet by relative movement of the collet with respect to the collet sleeve.

DETAILED DESCRIPTION OF THE INVENTION

Figure 1:
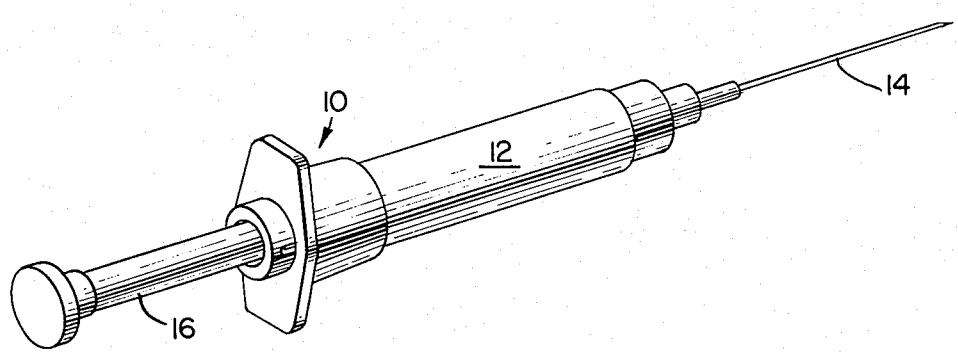
Figure 2:
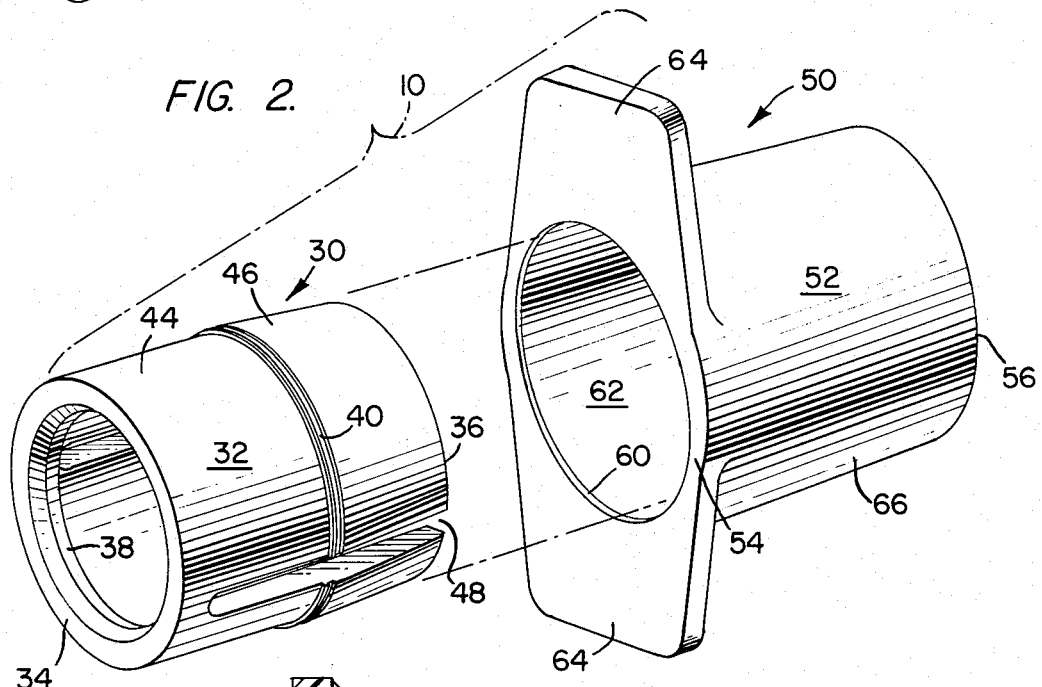

Referring to FIG. 1, the finger grip device 10 is adapted for use in conjunction with a cylindrical cartridge 12 equipped with a cannula 14 on its forward end. A plunger rod 16 is connected to the conventional plunger 18 (see FIG. 5) by means of threaded projection 20 which engages appropriately formed threads on the end of the plunger rod 16. The apparatus so assembled is ready for use as a syringe.

Figure 3:
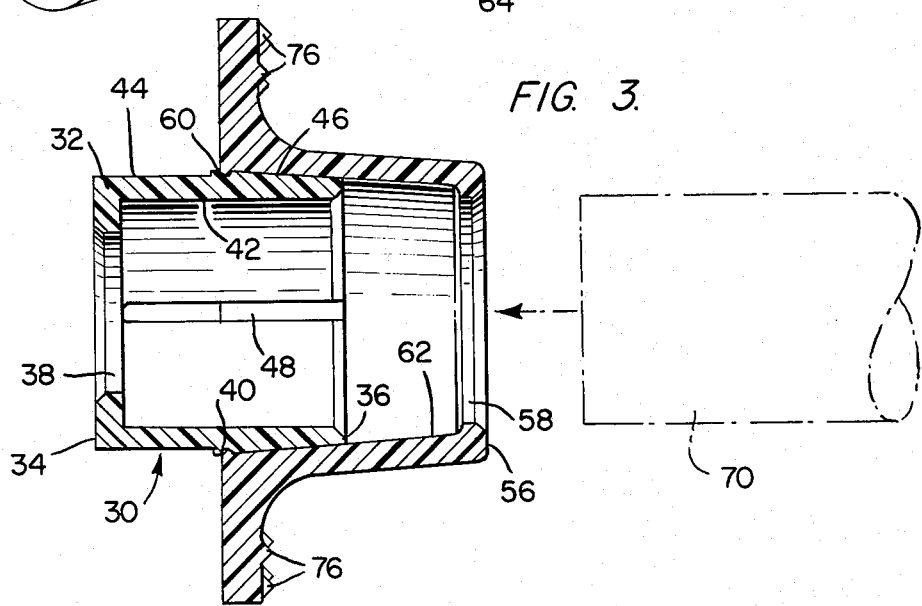

The finger grip device 10 comprises a collet 30 fitting within a collet sleeve 50 as shown in FIG. 3. More specifically, the collet 30 comprises a generally cylindrical body 32 open at the rear end 34 and also open at the front end 36. The rear end 34 is provided with an inturned flange 38 extending completely around the inner circumference of the cylindrical body 32. Midway its ends, the body 32 is provided with a peripheral retaining groove 40 for purposes to be later described.

The cylindrical body 32 has an inner surface 42 of uniform diameter throughout its length while the outer surface is divided into two sections, one on each side of the retaining groove 40. The rearwardly extending outer surface 44 has a uniform diameter throughout its length and the forwardly extending outer surface 46 has an inwardly and forwardly extending taper commencing at the retaining groove 40.

The collet 30 is provided with a pair of diametrical slots 48-48 in the cylindrical body 32 said slots extending from the rear end adjacent the inwardly turned flange 38 throughout the length of the body 32 whereby the collet is divided into two sections capable of being compressed toward each other to reduce the effective diameter of the inner surface 42.

The collet sleeve 50 comprises a cylindrical body 52 open at the rear end 54 and also open at the forward end 56. The forward end 56 of the body 52 is provided with an inturned annular stop 58 on the internal circumference thereof while the rearward end 54 has a positioning lip 60 on its internal circumferential surface. The internal surface 62 of the sleeve body 52 tapers forwardly and inwardly from the positioning lip 60 to the annular stop 58. Wing portions 64, which act as finger engageable elements, extend diametrically outward from the outer surface 66 of the sleeve body 52 adjacent the rear end 54.

Figure 4:
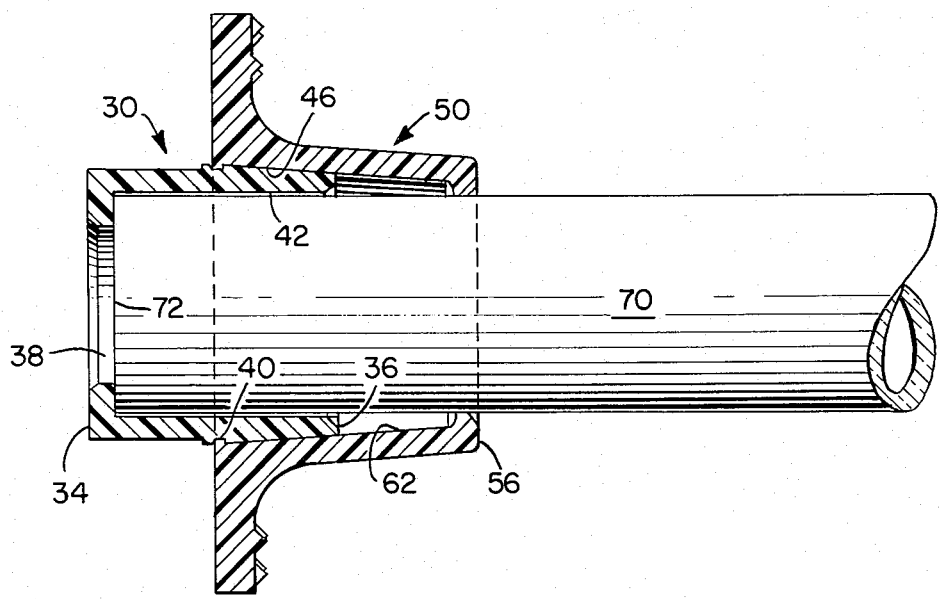
Figure 5:
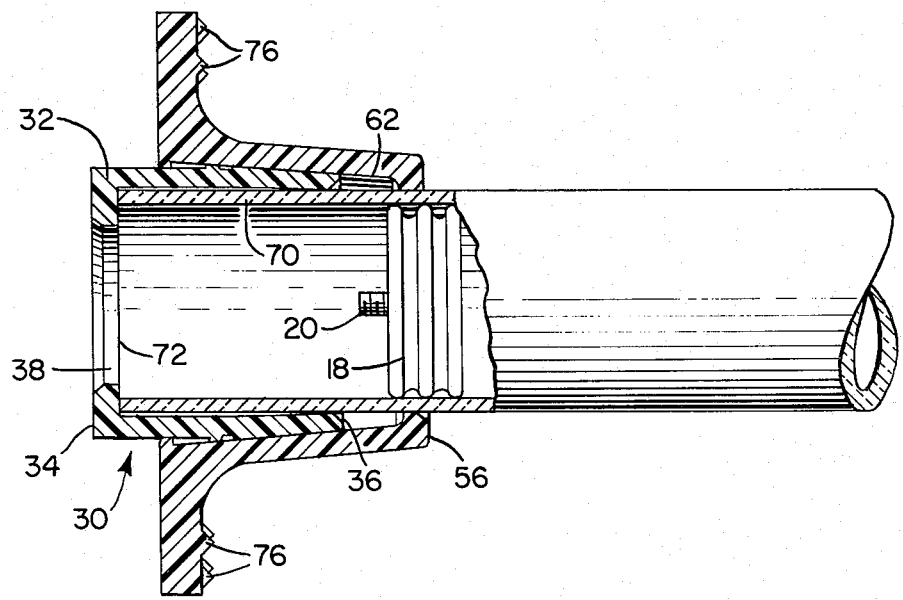

The assembly of the finger grip 10 and its association with the open end of a tubular cartridge is illustrated step-wise in FIGS. 3-5. Specifically, in FIG. 3 the collet 30 has been introduced into the collet sleeve 50 by passing the forward end 36 of the collet 30 into the rear end 54 of the sleeve body 50 so that the positioning lip 60 on the sleeve body will fit into the retaining groove 40 to maintain the collet and collet sleeve in assembled condition ready to receive cartridge tube 70. Referring to FIG. 4, the cartridge tube 70 has been inserted into the finger grip device 10 by introducing it into the forward end 56 of the collet sleeve 52 and on through the forward end 36 of the collet 30 until the end 72 of the cartridge tube 70 abuts the inturned flange 38 on the collet. Referring to FIG. 5, relative movement of the collet 30 and the collet sleeve 50 causes the tapered surface 62 on the collet sleeve to bear against the tapered surface 46 on the collet to thereby compress the collet so that its inner surface 42 will snugly engage the cartridge tube 70. Annular stop 58 on the collet sleeve body 52 acts to limit movement of the collet into the collet sleeve.

After the finger grip device 10 is assembled onto the cartridge tube 70 as illustrated in FIG. 5, the plunger rod 16 is threaded onto threaded projection 20 affixed to plunger 18 so that the syringe is completely assembled and ready for use as illustrated in FIG. 1. In order to provide optimum gripping effect the collet sleeve wings 64—64 are provided with conicallike projections 76.

The finger grip device of this invention is preferrably made of a plastic material which has the desired characteristics such as substantial shape retention qualities easy to mold and otherwise work, and inexpensive from a raw materials standpoint.

I claim:

1. A finger grip device for a syringe wherein the syringe includes a cylindrical cartridge having one end closed by a cannula assembly and the other end open, a plunger slidably carried within the cartridge and medicament located in the cartridge between the plunger and closed end of the cartridge said finger grip device fitting over and gripping the open end of the cartridge, the finger grip device comprising:

a collet, said collet having a cylindrical body open at both the rear and forward ends, the inner cylindrical surface being of uniform diameter, the outer surface of the body tapering outwardly and rearwardly from the forward end of the body, slot means in the collet body extending lengthwise and through the forward end thereof, a collet sleeve receiving the collet, said collet sleeve including a cylindrical sleeve body open at both its rear and forward ends, the inner surface of the sleeve body tapering outwardly and rearwardly from the forward end of said sleeve body to receive the tapered outer surface of the collet when said collet is inserted into the collet sleeve with its forward end facing the same direction as the forward end of the collet whereby relative movement of the collet with respect to the collet sleeve in the forward direction will cause the collet to be compressed and grip the open end of the cartridge over which it is passed, said collet sleeve being further provided with a pair of outwardly extending wing portions adapted to receive the fingers of the syringe user, and means for selectively positioning and holding said collet sleeve and said collet together in a retracted and assembled position to receive said cylindrical cartridge including retaining means on the rear end of the cylindrical body of the collet sleeve interengaging a biased outer mid-portion groove means on the collet.

2. A finger grip device adapted for securing to an open ended tube, said finger grip device comprising:

a collet, said collet having a cylindrical body open at both the rear and forward ends, the inner cylindrical surface being of uniform diameter, the outer surface of the body tapering outwardly and rearwardly from the forward end of the body, means for contractingly biasing the collet comprising a slot means in the collet body extending lengthwise and through the forward end thereof, a collet sleeve receiving the collet, said collet sleeve including a cylindrical sleeve body open at both its rear and forward ends, the inner surface of the sleeve body tapering outwardly and rearwardly from the forward end of said sleeve body to receive the tapered outer surface of the collet when said collet is inserted into the collet sleeve with its forward end facing the same direction as the forward end of the collet whereby relative movement of the collet with respect to the collet sleeve in the forward direction will cause the collet to be compressed and grip the open end of the tube over which it is adapted to be passed, and said collet sleeve being further provided with a pair of outwardly extending wing portions and interengaging retaining means on the rear end of the cylindrical sleeve body of the collet sleeve defining means for holding the outer mid portion of the collet to the collet sleeve in retracted and assembled position ready to receive the aforementioned tube.

3. The invention as set forth in claim 2 and wherein the collet is provided with stop means on its rearward end to limit movement of the cartridge into the collet.

* * * * *